United States Patent

Bullock et al.

[11] Patent Number: 6,065,824
[45] Date of Patent: *May 23, 2000

[54] METHOD AND APPARATUS FOR STORING INFORMATION ON A REPLACEABLE INK CONTAINER

[75] Inventors: Michael L. Bullock; Winthrop D Childers, both of San Diego, Calif.; Bartley Mark Hirst, Boise, Id.; Ronald D Stephens, Jr., Escondido, Calif.; Antoni Gil Miquel, Barcelona, Spain

[73] Assignee: Hewlett-Packard Company, Palo Alto, Calif.

[ * ] Notice: This patent is subject to a terminal disclaimer.

[21] Appl. No.: 08/961,852

[22] Filed: Oct. 31, 1997

Related U.S. Application Data

[60] Continuation-in-part of application No. 08/901,299, Jul. 28, 1997, Pat. No. 5,835,817, which is a division of application No. 08/584,499, Jan. 8, 1996, which is a continuation-in-part of application No. 08/363,188, Dec. 22, 1994, Pat. No. 5,491,540.

[51] Int. Cl.[7] ................................. B41J 29/393
[52] U.S. Cl. .............................. 347/19; 347/86
[53] Field of Search ................... 347/7, 19, 86, 347/87; 399/12, 13, 24, 25, 31, 38, 46, 50, 53, 90, 111, 113, 110, 109, 122, 119, 120, 262

[56] References Cited

U.S. PATENT DOCUMENTS

| | | | |
|---|---|---|---|
| Re. 36,279 | 8/1999 | Ujita | 347/86 |
| 4,551,000 | 11/1985 | Kanemitsu et al. | |
| 4,803,521 | 2/1989 | Honda | |
| 4,961,088 | 10/1990 | Gilliland et al. | |
| 5,016,171 | 5/1991 | Connolly et al. | 364/406 |
| 5,049,898 | 9/1991 | Arthur et al. | 346/1.1 |
| 5,137,379 | 8/1992 | Ukai et al. | 400/121 |
| 5,184,181 | 2/1993 | Kurando et al. | |
| 5,266,968 | 11/1993 | Stephenson | |
| 5,272,503 | 12/1993 | LeSueur et al. | |
| 5,283,613 | 2/1994 | Midgley, Sr. | |
| 5,365,312 | 11/1994 | Hillmann et al. | 399/12 |
| 5,410,641 | 4/1995 | Wakabyaski et al. | 395/112 |
| 5,506,611 | 4/1996 | Ujita et al. | 347/86 |
| 5,512,988 | 4/1996 | Donaldson | 399/120 |
| 5,561,499 | 10/1996 | Setoriyama | 399/111 |
| 5,572,292 | 11/1996 | Chatani et al. | 399/25 |
| 5,589,859 | 12/1996 | Schantz | 347/19 |
| 5,610,635 | 3/1997 | Murray et al. | 347/7 |
| 5,835,817 | 11/1998 | Bullock et al. | 399/25 |

FOREIGN PATENT DOCUMENTS

| | | |
|---|---|---|
| 0086061B1 | 6/1987 | European Pat. Off. |
| 0720916A2 | 7/1995 | European Pat. Off. |
| 59-61854 | 4/1984 | Japan |
| 63-92959 | 4/1988 | Japan |
| 2-144571 | 6/1990 | Japan |
| 2216437 | 10/1989 | United Kingdom |

OTHER PUBLICATIONS

Xerox Disclosure Journal, vol. 8, No. 6, Nov.–Dec. 1983, p. 503, Robert A. Lonis, "Storage of Operating Parameters in Memory Integral with Printhead".
Hardcopy Observer, Oct. 1995, Calcomp Inc., p. 23, "Products".
Product Description, 1995, pp. 1–4, Calcomp Inc., "TechJET 175i".
InkPac–C, Calcomp Inc., pp. 1–2, "Intelligent Ink Delivery InkPac".

*Primary Examiner*—William J. Royer
*Attorney, Agent, or Firm*—Kevin B. Sullivan

[57] ABSTRACT

The present disclosure relates to a replaceable ink cartridge for providing ink to an ink-jet printer. The replaceable ink cartridge includes a memory associated with the replaceable ink container. The memory has a single data terminal and a reference terminal. The memory is responsive to control signals provided to a single data terminal relative to the reference terminal by the ink-jet printer for providing a data signal representative of stored information to the single data terminal relative to the reference terminal. The data signal is sensed by the ink-jet printer for adjusting printer operation.

14 Claims, 3 Drawing Sheets

FIG. 1B SECTION A-A

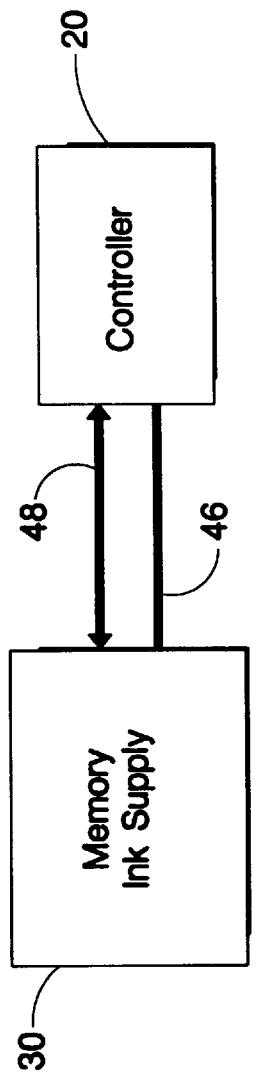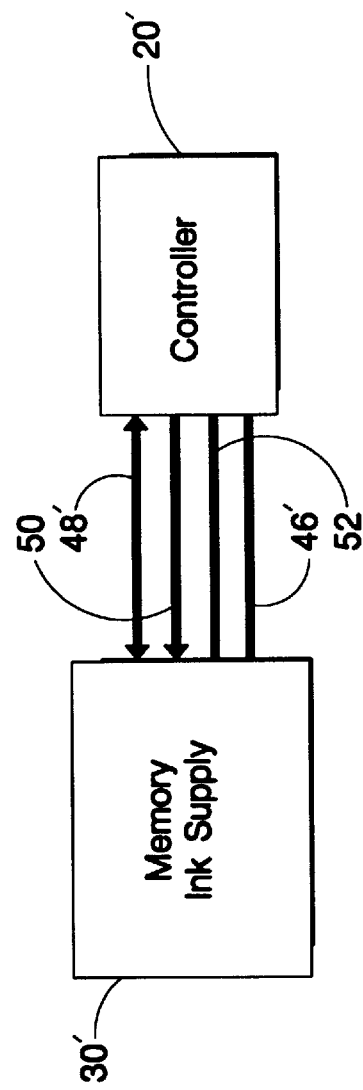

METHOD AND APPARATUS FOR STORING INFORMATION ON A REPLACEABLE INK CONTAINER

CROSS REFERENCES TO CO-PENDING APPLICATION

This application is a continuation-in-part of U.S. patent application Ser. No. 08/901,299 filed on Jul. 28, 1997, now U.S. Pat. No. 5,835,817, which is a divisional of U.S. patent application Ser. No. 08/584,499 filed Jan. 8, 1996 which is a continuation-in-part of U.S. patent application Ser. No. 08/363,188 filed Dec. 22, 1994, now U.S. Pat. No. 5,491,540.

BACKGROUND OF THE INVENTION

The present invention relates to ink-jet printing systems that make use of replaceable ink containers. More particularly, the present invention relates to a replaceable ink container that includes a memory for storing printer parameter information for access by an ink-jet printer.

Ink-jet printers frequently make use of an ink-jet printhead mounted to a carriage that is moved back and fourth across a print media, such as paper. As the printhead is moved across the print media, a control system activates the printhead to deposit or eject, ink droplets onto the print media to form images and characters.

One type of ink-jet printer previously used makes use of a replaceable ink cartridge. The ink cartridge includes a printhead and an ink reservoir that are contained within cartridge housing. When the ink reservoir is depleted of ink or a different type of ink is required for a particular print media the entire ink cartridge is replaced. Another type of ink-jet printer, disclosed in patent application Ser. No. 08/566,521 assigned to the assignee of the present invention, makes use of an ink-jet printhead and an ink supply that can each be separately replaced. For this type of ink-jet printer the ink supply is spaced from the printhead. The printhead is mounted to the carriage and ink is provided to the printhead by way of a flexible fluid interconnect extending between the ink supply and the printhead. For this type of arrangement, the ink supply container can be replaced without replacing the printhead. The printhead is then replaced at the printhead end of life.

It is frequently desirable to alter printer parameters concurrently with the replacement of printer consumables as discussed in U.S. patent application Ser. No. 08/584,499 entitled "Replaceable Part with Integral Memory for Usage, Calibration and Other Data" assigned to the assignee of the present invention. There are several reasons for updating printer parameters. One reason for updating printer parameters is to incorporate engineering improvements into the printer. Another reason for updating printer parameters is to optimize the printer for the particular consumable to be installed in the printer.

One method for altering printer parameters is discussed in patent application Ser. No. 08/584,499 is the use of a memory that is associated with the replaceable ink container. For this embodiment, insertion of the replacement ink container establishes an electrical connection between the printer and the memory associated with the ink container. This electrical connection allows for the exchange of information between the printer and the memory. Updating or altering printer parameters at the same time as the ink container is replaced ensures that the printer is optimized for the particular ink used. In addition, updating printing parameters with the replacement of the ink container ensures that the printer makes use of the latest printer parameters.

It is important that the electrical connection between the printer and the memory associated with the ink container be highly reliable. This electrical interconnection should be readily manufacturable and should not add significantly to the overall cost of the printing system.

SUMMARY OF THE INVENTION

The present invention relates to a replaceable ink cartridge for providing ink to an ink-jet printer. The replaceable ink cartridge includes a memory associated with the replaceable ink container. The memory has a single data terminal and a reference terminal. The memory is responsive to control signals provided to a single data terminal relative to the reference terminal by the ink-jet printer for providing a data signal representative of stored information to the single data terminal relative to the reference terminal. The data signal is sensed by the ink-jet printer for use in printer operation.

BRIEF DESCRIPTION OF THE DRAWINGS

FIG. 1A and 1B depict a schematic diagram representing an ink-jet printing system that includes replaceable ink container having a memory thereon for transferring information from the ink container to a printer control portion.

FIG. 3 depicts a block diagram representing one embodiment of the electrical interface between the printer control portion and the ink container memory.

FIG. 4 depicts a block diagram representing an alternative embodiment of the electrical interface between the printer control portion and the ink container memory.

DETAILED DESCRIPTION OF THE PREFERRED EMBODIMENT

Figure 1A:
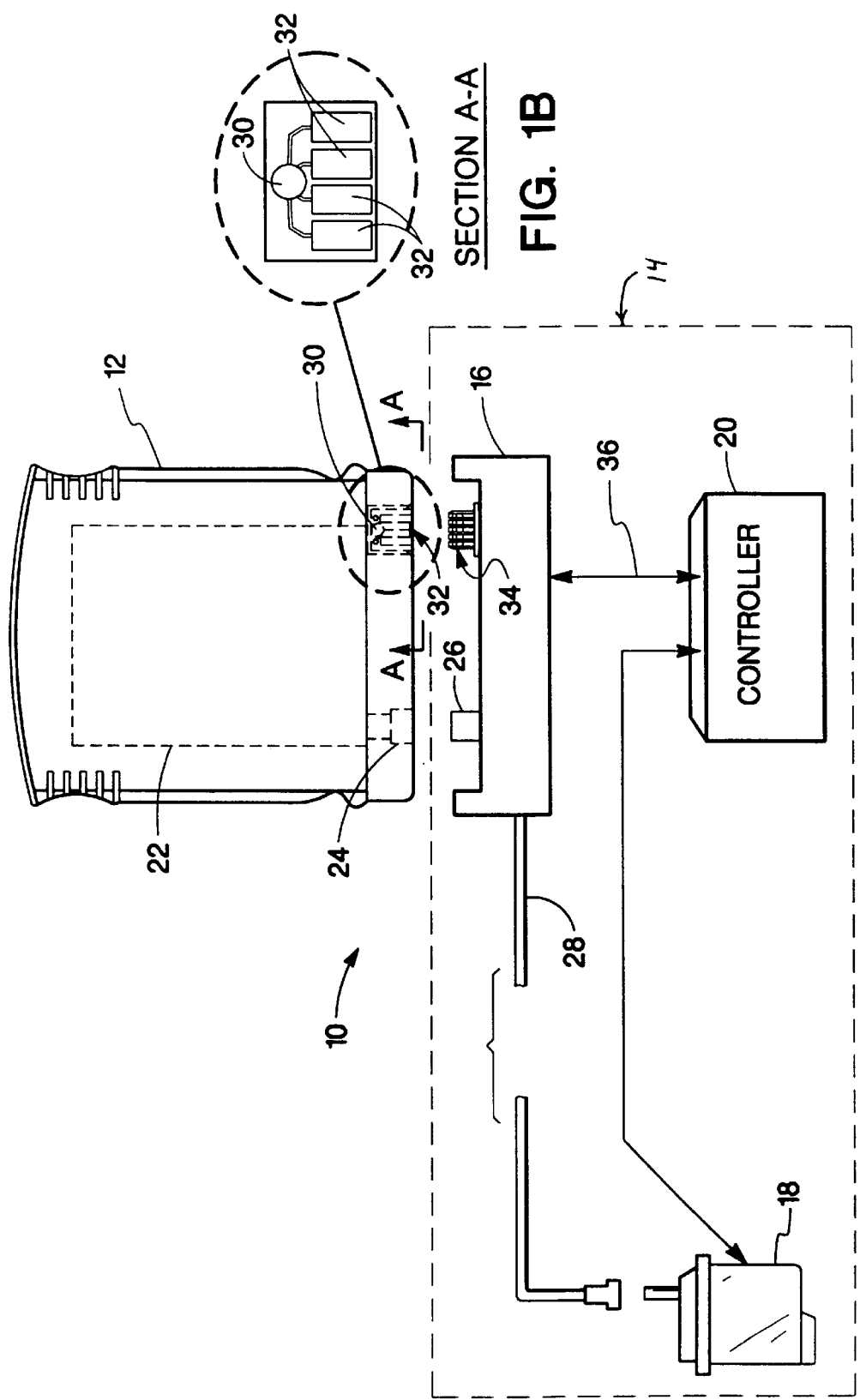

FIGS. 1A and 1B represent an ink-jet printing system 10 of the present invention. The ink-jet printing system 10 includes an ink container or cartridge 12 and a printer portion 14. The printer portion 14 includes an ink container receiving station or a receptacle 16, a printhead 18 and a controller 20. With the ink container 12 properly inserted into the ink container receiving station 16, an electrical and a fluidic coupling is established between the ink container 12 and the printer portion 14. The fluidic coupling allows ink stored within the ink container 12 to be provided to the printhead 18. The electrical coupling allows information to be passed between the ink container 12 and the printer portion 14 to ensure the operation of printer portion 14 is compatible with the ink contained in the ink cartridge 12 to achieve optimal print quality.

In addition to transferring information between the printer portion 14 and the ink container 12, the controller 20 controls the relative movement of the printhead 18 and the print media (not shown). The controller 20 also selectively activates the printhead 18 to deposit ink on the print media. By selectivly activating the printhead 18, as the printhead 18 and print media are moved relative to each other, images and text are formed on print media.

The ink container 12 includes a reservoir 22 for storing ink therein. A fluid outlet 24 is provided that is in fluid communication with the fluid reservoir 22. The fluid outlet 24 is configured for connection to a complimentary fluid inlet 26 associated with the ink container receiving station 16. A fluid conduit 28 is connected between the fluid inlet 26 and the printhead 18. This fluid conduit 28 may be a continuous fluid conduit in the case of a flexible conduit or an intermittent fluid conduit in the case where the printhead is positioned at a refilling station for replenishing ink. In either case, with the ink container 12 properly inserted into the ink container receiving station 16, fluid communication is established between the ink container 12 and the printhead 18.

The ink container 12 also includes an information storage device or memory 30 for storing information related to the ink container 12. A plurality of electrical contacts 32 are provided that are each electrically connected to the electrical storage device 30. With the ink container 12 properly inserted into the ink container receiving station 16, each of the plurality of electrical contacts 32 engage each of a plurality of electrical contacts 34 associated with the ink container receiving station 16. Each of the plurality of electrical contacts 34 is electrically connected to the controller 20 by a plurality of electrical conductors 36. With proper insertion of the ink container 12 into the ink container receiving station 16, the memory 30 associated with the ink container 12 is electrically connected to the controller 20 allowing information to be transferred between the ink container 12 and the printer portion 14.

The memory 30 associated with the ink container 12 is shown having 4 electrical contacts or terminals 34, although the number of terminals can be even fewer than four. As discussed later with respect to FIG. 4 the memory 30 may have only two electrical contacts 32 associated therewith. It is generally preferred that the number of electrical contacts 32 be kept relatively small in order to increase the reliability of the connection between the ink container 12 and the printer portion 14.

Figure 2:
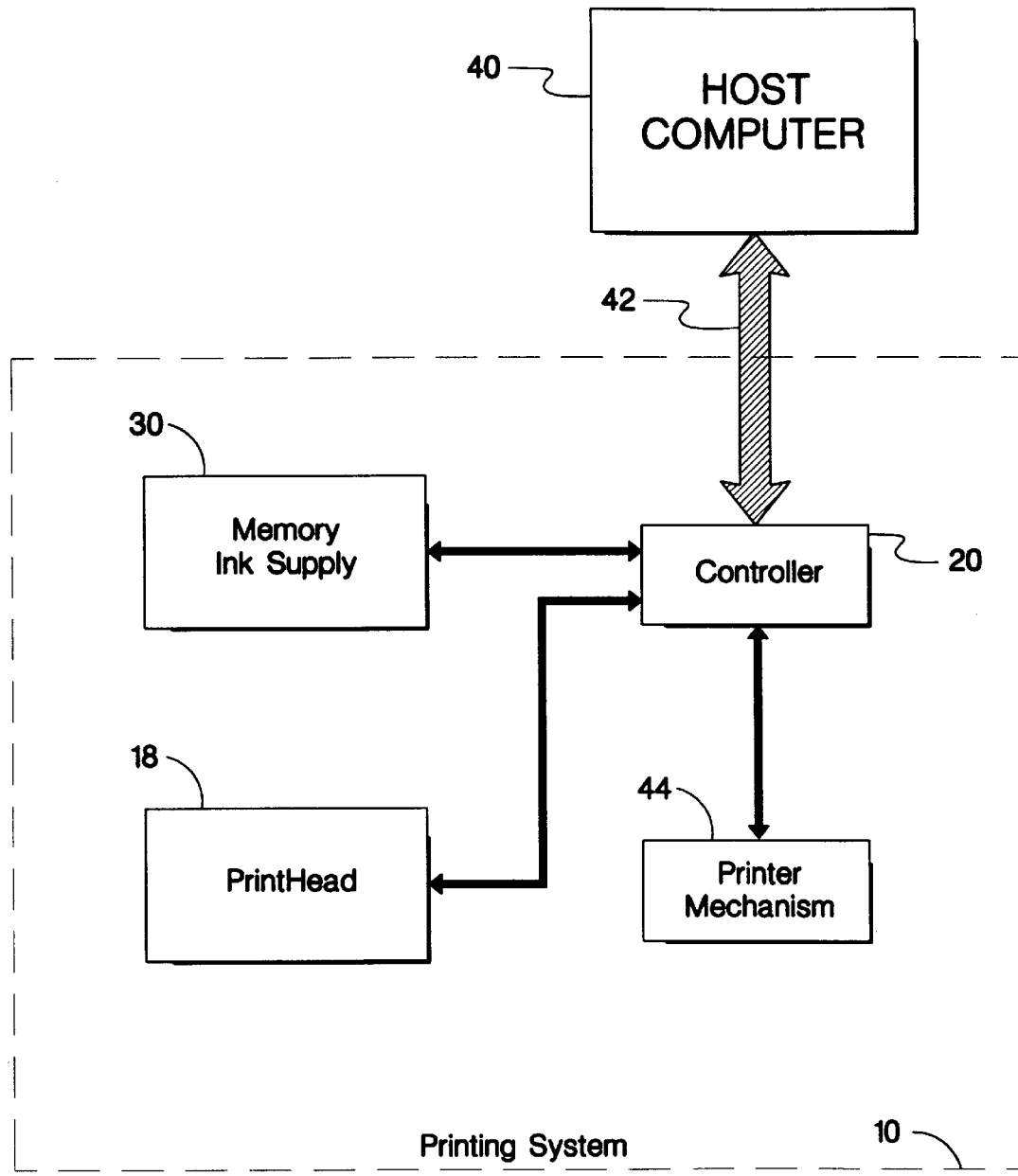
FIG. 2 depicts a block diagram representing the ink-jet printing system shown in FIG. 1.

FIG. 2 is a block diagram representing the ink-jet printing system 10 shown connected to an information source or host computer 40. The host computer 40 is a conventional computer, such as a workstation, server or personal computer, to name a few, that provides image information to the controller 20 by way of a link 42. The link 42 is a conventional printer interface such as an electrical link or an infrared link for allowing information transfer between the host computer 40 and the printing system 10.

The controller 20 controls a printer mechanism 44 and the printhead 18 to selectively eject ink droplets as the printhead and print media are moved relative to each other. Various parameters for controlling operation of the printing system 10 are provided by the host computer 40 or are provided by the memory 30 associated with the ink supply 12. Printer parameter information provided by the host computer 40 is typically resident in printer control software that is typically referred to as the "print driver". One problem with providing printer parameter information from the print driver which is resident in the host computer 40 is that the print driver software is typically not updated often. An important aspect of the present invention is the use of a memory 30 on the ink container 12 to provide printer parameter information to the controller 20. Because the ink container 12 is regularly replaced when the ink is exhausted, printer parameters can be updated regularly to ensure the highest print quality. In addition, printer parameters, which are unique to the particular ink contained in the ink container 12, can be updated using the memory 30 automatically without requiring the user to configure the printer or print driver for the particular ink container 12 installed. By automatically updating printer parameters the printing system 10 provides consistent output quality as well as improved ease-of-use.

Among the parameters stored in the memory 30 on ink container 12 may be the following: actual count of ink drops emitted from the printhead 18; date code of the ink supply; date code of initial insertion of the ink container 12; system coefficients; ink type/color; ink container size; print mode; temperature data and heater resistor parameters; age of the ink container; drop count for the printhead 18; a pumping algorithm for the case where the ink container 12 is pressurized for higher ink flow rates between the ink container 12 and printer portion 14; printer serial number; cartridge usage information; to name a few.

Upon insertion of the ink container 12 into the printer portion 14 the controller 20 reads the parameter information from the memory 30 for controlling various printing functions within the printing system 10. For example, the controller 20 computes an estimate of remaining ink in the ink container 12 and compares the estimate against prerecorded supply thresholds. If the ink remaining in the ink container 12 is found to be less than 25% of full capacity, a message is provided to the user indicating the remaining ink level. Further, when a substantial portion of the remaining 25% of the ink is consumed, the controller 20 can disable the ink-jet printing system 10 to prevent dry firing of the printhead which can result in a damage to the printhead 18.

Another example of how parameter information stored in the memory 30 can be used by the controller 20 is to verify that proper ink type and color is installed properly in the printing system 10. In addition, the controller 20 can provide a notice to the user when the ink within the ink container 12 is beyond its shelf-life so that the ink container 12 can be replaced ensuring maximum print quality.

FIG. 3 shows greater detail of the electrical connection between the controller 20 and the memory 30 associated with the ink container 12. For this embodiment the memory 30 is a memory that is capable of performing information transfers with the controller 20 entirely over a single wire communication line 48 and a common ground reference or ground return conductor 46. Information transfers from the memory 30 (memory read operations) to the controller 20 and information transfers from the controller 20 to the memory 30 (memory write operations) are performed entirely over a single wire communication line 48 and the ground reference 46.

The transfer of information to and from the memory 30 over the single wire communication line 48 and ground reference 46 is accomplished using a one-wire protocol. Data address and control information is transferred between the controller 20 and the memory 30 in a serial fashion using this one-wire protocol. In one embodiment, the memory 30 is a 1K Bit read/write Electrically Programmable Read Only Memory (EPROM) such as the Dallas Semiconductor part number DS 1982, manufactured by the Dallas Semiconductor Corporation.

For the embodiment shown in FIG. 3 power is provided to the memory 30 via the single-wire communication line 48. For this embodiment, the memory 30 derives its power from the presence of a high signal on the one wire communication line 48. An internal capacitor that is integral with the memory 30 stores energy when the single wire communication line 48 is high such that the memory 30 can operate off the stored energy when the signal on the single wire communication line 48 is low. Therefore, only a single electrical terminal or contact 32 and ground terminal or contact 32 is required for the memory 30 to provide power, control, data and address information to the memory 30.

The use of a serial, bidirectional, single-wire communication line 48 for transferring information between the controller 20 and the memory 30 provides for a highly reliable electrical interconnect between the memory 30 and the controller 20. In addition, power and control information are also provided on the one-wire communication line 48 even further reducing the number of electrical interconnects required between the memory 30 and the controller 20 further increasing reliability as well as reducing manufacturing costs.

FIG. 4 represents an alternative embodiment of the memory 30 and electrical interconnection between the memory 30 and the controller 20 shown in FIG. 3. Similar numbering will be used in FIG. 4 to represent structures similar to those shown in the embodiment shown in FIG. 3. The embodiment of FIG. 4 is similar to the embodiment of FIG. 3 except that instead of providing power and all control information to the memory 30 via the single-wire communication line 48 as shown in FIG. 3 the embodiment of FIG. 4 makes use of a memory 30' that has a separate electrical conductor for providing a power and a clock signal. One example of a commercially available part similar to the memory 30' is a memory sold as part number 24C00 128 bit Serial EEPROM manufactured by Microchip Technology Inc.

Data is transferred between memory 30' and the controller 20' via a serial, bidirectional, single-wire communication line 48' and a ground or signal return 46' in a manner similar to the single-wire communication line 48 shown in FIG. 3. During memory read operations address information is provided in a serial manner to the memory 30' over the single-wire communication line 48' by the controller 20'. Data corresponding to the address information is provided serially to the controller 20' over the single-wire communication line 48' by the memory 30'. During memory write operations data and address information is provided to the memory 30' in a serial fashion over the single-wire communication line 48'. An interface protocol, similar to the one-wire communication protocol, is use to ensure orderly transfer of this address, data and command information.

A serial clock line 50 is provided to the memory 30' as an additional control line for providing control signals from the controller 20' to the memory 30'. The clock line 50 ensures that data is properly transferred on the single wire communication line 48'. For example, the memory 30' samples data on a transition of the clock line from low to high. Therefore, care must be taken to ensure the data is stable prior to the low to high transition of the clock line 50.

A separate power electrical conductor 52 is provided to the memory 30' in the embodiment shown in FIG. 4 instead of providing power on the one-wire communication line 48, as shown in the embodiment of FIG. 3.

The use of a serial bi-directional communication line for transferring data between the controller 20 and the memory 30, 30' associated with the ink container 12 reduces the number of electrical connections required between the memory 30, 30' and the controller 20, 20', respectively. For example, the embodiment shown in FIG. 3 requires only two electrical contacts or terminals 32 associated with the ink container 12 for transferring information between the ink container 12 and the printer portion 14 (see FIG. 1). One of the terminals 32 is connected to the single-wire communication wire 48 and the other terminal connected to the ground wire 46.

The embodiment shown in FIG. 4 requires only four electrical contacts or terminals 32 associated with the ink container 12 as shown in FIG. 1B. The use of a small number of electrical connections between the memory 30, 30' and controller 20 enhances the reliability of this electrical connection as well as reducing the manufacturing costs associated with the printing system.

What is claimed is:

1. A replaceable ink cartridge for providing ink to an ink-jet printer, the replaceable ink cartridge including:

a memory associated with the replaceable ink cartridge, the memory having a single data terminal and a reference terminal, the memory responsive to control signals received on a single data terminal relative to the reference terminal for providing a data signal representative of stored information to the single data terminal relative to the reference terminal, the data signal being sensed by the ink-jet printer for use in printer operation.

2. The replaceable ink cartridge of claim 1 wherein the memory is a semiconductor memory.

3. The replaceable ink cartridge of claim 1 wherein data signals are provided between the single data terminal and the reference terminal by the ink-jet printer for transferring data from the ink-jet printer to the memory.

4. The replaceable ink cartridge of claim 1 wherein memory address signals are provided between the single data terminal and the reference terminal for transferring memory address information between the memory and the ink-jet printer.

5. The replaceable ink cartridge of claim 1 wherein memory control signals are provided between the single data terminal and the reference terminal for transferring memory control information between the memory and the ink-jet printer.

6. The replaceable ink cartridge of claim 1 wherein the memory further includes a clock terminal and for controlling information transfer between the ink-jet printer and the memory.

7. The replaceable ink cartridge of claim 1 wherein a supply voltage provided by the ink-jet printer is applied across the single data terminal and the reference terminal.

8. The replaceable ink cartridge of claim 1 further including a supply terminal and wherein a supply voltage provided by the ink-jet printer is applied across the supply terminal and the reference terminal.

9. The replaceable ink cartridge of claim I wherein stored information within the memory includes parameter information indicative of at least one of the following ink cartridge parameters, ink cartridge size, date information, serial number information and remaining ink information.

10. A replaceable ink cartridge for providing ink to an ink-jet printer, the replaceable ink cartridge including:

an information storage device responsive to the ink-jet printer for transferring information between the ink-jet printer and the information storage device, the information storage device comprising:

a single data terminal electrically connected to the information storage device; and a reference terminal electrically connected to the information storage device, the information storage device providing a data signal on the single data terminal relative to the reference terminal, the data signal being indicative of information stored in the information storage device.

11. The replaceable ink cartridge of claim 10 wherein the information storage device provides data in a serial fashion to the single data terminal relative to the reference terminal.

12. A method for providing information from an information storage device associated with an ink container to an ink-jet printer, the method comprising:

receiving a signal representative of address information on a single data terminal associated with the information storage device relative to a reference terminal;

accessing information corresponding to the received address information; and providing a signal representative of the accessed information to the single data terminal relative to the reference terminal, the inkjet printer sensing the signal representative of the accessed information.

13. The method for providing information from an information storage device associated with an ink container of claim 12 wherein the receiving of a signal representative of address information and the providing of a signal representative of the accessed information is accomplished by transfer of information in a serial fashion.

14. A replaceable ink container for providing ink to an ink-jet printer, the replaceable ink container including:

a memory associated with the replaceable ink container, the memory comprising:

a data storage portion;

a reference terminal electrically connected to the data storage portion, the reference terminal configured for connection to the ink-jet printer; and a bi-directional data terminal electrically connected to the data storage portion, the bi-directional data terminal configured for connection to the ink-jet printer for transferring data in a serial fashion between the data storage portion and the ink-jet printer.

* * * * *